United States Patent
Higuchi et al.

(10) Patent No.: US 10,021,015 B2
(45) Date of Patent: Jul. 10, 2018

(54) NETWORK CONTROL DEVICE, NETWORK CONTROL METHOD, AND STORAGE MEDIUM

(71) Applicant: NEC Corporation, Minato-ku, Tokyo (JP)

(72) Inventors: Yuta Higuchi, Tokyo (JP); Toshio Koide, Tokyo (JP); Yuta Ashida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 81 days.

(21) Appl. No.: 15/036,864

(22) PCT Filed: Oct. 15, 2014

(86) PCT No.: PCT/JP2014/005221
§ 371 (c)(1),
(2) Date: May 16, 2016

(87) PCT Pub. No.: WO2015/075862
PCT Pub. Date: May 28, 2015

(65) Prior Publication Data
US 2016/0285737 A1    Sep. 29, 2016

(30) Foreign Application Priority Data
Nov. 20, 2013   (JP) .................................. 2013-240177

(51) Int. Cl.
*H04L 12/751*    (2013.01)
*H04L 12/715*    (2013.01)
(Continued)

(52) U.S. Cl.
CPC .............. *H04L 45/02* (2013.01); *H04L 45/38* (2013.01); *H04L 45/42* (2013.01); *H04L 45/64* (2013.01)

(58) Field of Classification Search
CPC ......... H04L 45/02; H04L 45/38; H04L 45/42; H04L 47/10; H04L 45/64
(Continued)

(56) References Cited

U.S. PATENT DOCUMENTS

2011/0307628 A1* 12/2011 Chiba ................... H04L 49/253
709/241
2013/0128746 A1* 5/2013 Yedavalli ................ H04L 45/38
370/238

FOREIGN PATENT DOCUMENTS

EP          2597831 A1     5/2013
JP       2013-175912 A     9/2013
WO      2012/096131 A1     7/2012

OTHER PUBLICATIONS

Extended European Search Report for EP Application No. EP14864748.0 dated Jun. 28, 2017.
(Continued)

*Primary Examiner* — Obaidul Huq

(57) ABSTRACT

A network control device includes a network database and a switch controller. The network database stores topology information representing a network, and network flow information representing a data forwarding rule in the network. The switch controller generates the topology information by taking a plurality of switch devices included in the network as nodes and stores the generated topology information in the network database, generates switch flow information that defines an action of each of the plurality of switch devices, based on the network flow information stored in the network database, and sets the switch flow information into a corresponding one of the plurality of switch devices.

8 Claims, 14 Drawing Sheets

(51) Int. Cl.
*H04L 12/717* (2013.01)
*H04L 12/721* (2013.01)

(58) Field of Classification Search
USPC .......................................... 370/229, 235, 254
See application file for complete search history.

(56) References Cited

OTHER PUBLICATIONS

Nick McKeown et al., "OpenFlow: Enabling Innovation in Campus Networks" ACM SIGCOMM Computer Communication Review, vol. 38, No. 2, Apr. 2008.
"OpenFlow Switch Specification Version 1.0.0 (Wire Protocol 0x01)", Dec. 31, 2009.
Yasunobu Chiba, Yusuke Shinohara and Hideyuki Shimonishi, "Source Flow: Handling Millions of Flows on Flow-based Nodes", ACM SIGCOMM Computer Communication Review, vol. 40, issue 4, pp. 465-466, Oct. 2010.
Yuta Ashida, Toshio Koide, Yasunobu Chiba, and Hideyuki Shimonishi, "A communication load reduction method on Source Flow based large-scale OpenFlow Networks", The Institute of Electronics, Information and Communication Engineers, IEICE Technical Report, Network System 110 (448), pp. 341-346, Feb. 2011.
Toshio Koide, Yuta Ashida, and Hideyuki Shimonishi, "A study on network abstraction model in SDN control platform and its evaluation", The Institute of Electronics, Information and Communication Engineers, IEICE Technical Report, Vo. 113, No. 7, CQ2013-8, pp. 41-46, Apr. 2013.
Yuta Ashida et al., "A study on consistency maintenance method of inter-domain flow in multi-domain OpenFlow Networks", The Institute of Electronics, Information and Communication Engineers Technical Report, vol. 112, No. 463, pp. 465-470, p. 466 '3. Network Abstraction Architecture', Feb. 28, 2013.
Kouhei Sugiyama et al., "NMF: Network Mining Framework using Topological Structure of Complex Networks", The Institute of Electronics, Information and Communication Engineers Technical Report, , vol. 107, No. 314, pp. 7-12 "2.2 I/O format.", Nov. 8, 2007.
International Search Report for PCT Application No. PCT/2014/005221, dated Nov. 18, 2014.
English translation of Written opinion for PCT Application No. PCT/2014/005221.

* cited by examiner

NETWORK CONTROL DEVICE, NETWORK CONTROL METHOD, AND STORAGE MEDIUM

CROSS-REFERENCE TO RELATED APPLICATION

The present application is a National Stage Entry of PCT/2014/005221 filed Oct. 15, 2014, which is based on and claims the benefit of the priority of Japanese Patent Application No. 2013-240177, filed on Nov. 20, 2013, the disclosures of all of which are incorporated herein in their entirety by reference.

TECHNICAL FIELD

The present invention relates to a network control device, a network control method, and a network control program.

BACKGROUND ART

In recent years, a technology called OpenFlow has been proposed (see NPL 1 and NPL 2).

OpenFlow sees communications as end-to-end flows and performs routing control, fault recovery, load balancing, and optimization on a per-flow basis. An OpenFlow switch, whose specifications are defined in NPL 2, includes a secure channel for communicating with an OpenFlow controller and operates according to a flow table to which instruction for addition or rewriting are given by the OpenFlow controller as may be necessary.

A flow table contains, for each flow, a set of definitions of matching conditions against which a packet header is compared (Header Fields); flow statistics information (Counters); and actions defining specific processing (Actions) (see Section 3 "Flow Table" in NPL 2).

Upon receipt of a packet, an OpenFlow switch searches the flow table for a flow entry that has matching conditions matching the header information in the received packet (see Section 3.1 "Header Fields" and Section 5.2.3 "Flow Match Structures" in NPL 2). When the OpenFlow switch finds any flow entry matching the received packet after searching the table, the OpenFlow switch updates the flow statistics information and performs on the received packet the actions written in the Actions field in the flow entry (for example, forwarding a packet from a specified port, flooding, or dropping). When the OpenFlow switch finds no flow entry matching the received packet after searching the table, the OpenFlow switch transmits a request for setting a flow entry (in other words, a request for sending control information for processing the received packet) to the OpenFlow controller via the secure channel. Such request message is called a Packet-In message. Then, after receiving from the OpenFlow controller a flow entry that defines specific processing, the OpenFlow switch updates the flow table. In this way, an OpenFlow switch forwards a packet using a flow entry stored in the flow table as control information.

Centrally-controlled networks, such as OpenFlow among others, allow for highly granular control on a per-flow basis. On the other hand, however, limitation of resources such as the restricted number of flow tables that a switch device can handle is imposed on such networks. To handle large-scale flows, this resource limitation may be problematic. Techniques to optimize utilization of resources by switch devices are described in, for example, NPL 3 and NPL 4. NPL 3 and NPL 4 respectively propose a technique and the like for efficient use of resources for the switch devices needed for forwarding over a core network by rewriting, at network edge switches, a header so as to embed path information for individual flows, while, in the core network, setting common flow entries that can be shared by existing flows.

Each application on a system employing OpenFlow is developed and implemented so that such optimization technique is incorporated according to the applicable environment. In this case, the application will be modified in order to use any new emerging optimization technology.

NPL 5 describes separating an application from a flow setting device (OpenFlow controller) to make them independently exchangeable, by introducing a theoretical network model and a network flow representation expressing data forwarding rules in the network model and by programming an application so as to operate such model. The technique described in NPL 5 can suppress an increase in man-hours for development.

CITATION LIST

Non Patent Literature

[NPL 1]: Nick McKeown, et al., "OpenFlow: Enabling Innovation in Campus Networks", [online], Mar. 14, 2008, [retrieved on Sep. 5, 2013], Internet <URL: http://www.openflow.org/documents/openflow-wp-latest.pdf>

[NPL 2]: "OpenFlow Switch Specification Version 1.0.0 (Wire Protocol 0x01)", [online], Dec. 31, 2009, [retrieved on Sep. 5, 2013], Internet <URL: http://www.openflow.org/documents/openflow-spec-v1.0.0.pdf>

[NPL 3]: Yasunobu Chiba, Yusuke Shinohara and Hideyuki Shimonishi, "Source Flow: Handling Millions of Flows on Flow-based Nodes", ACM SIGCOMM Computer Communication Review, Vol. 40, issue 4, pp. 465-466, October 2010.

[NPL 4]: Yuta Ashida, Toshio Koide, Yasunobu Chiba, and Hideyuki Shimonishi, "A communication load reduction method on Source Flow based large-scale OpenFlow Networks", The Institute of Electronics, Information and Communication Engineers, IEICE Technical Report, Network System 110 (448), pp. 341-346, February 2011.

[NPL 5] Toshio Koide, Yuta Ashida, and Hideyuki Shimonishi, "A study on network abstraction model in SDN control platform and its evaluation", The Institute of Electronics, Information and Communication Engineers, IEICE Technical Report, Vo. 113, No. 7, CQ2013-8, pp. 41-46, April 2013.

SUMMARY OF INVENTION

Technical Problem

As mentioned above, using the technique described in NPL 5 can suppress an increase in man-hours for development. However, the network flow representations express data forwarding rules in a theoretical network model, and thus they cannot be directly used as flow entries actually set into OpenFlow switches.

Accordingly, an object of the present invention is to provide a network control device, a network control method, and a storage medium that are capable of controlling each of switch devices using topology information that represents a network formed by the switch devices, as well as using network flow information that represents data forwarding rules in the network if there is introduced the network flow information.

Solution to Problem

A network control device according to the present invention includes: a network database that stores topology information representing a network, and network flow information representing a data forwarding rule in the network; and a switch controller that generates the topology information by taking a plurality of switch devices included in the network as nodes and stores the generated topology information in the network database, generates switch flow information that defines an action of each of the plurality of switch devices, based on the network flow information stored in the network database, and sets the switch flow information into a corresponding one of the plurality of switch devices.

A network control method according to the present invention is a method to be applied to a network control device that includes a network database that stores topology information representing a network and network flow information representing a data forwarding rule in the network, the network control method including: generating the topology information by taking a plurality of switch devices included in the network as nodes and storing the generated topology information in the network database; and generating switch flow information that defines an action of each of the plurality of switch devices, based on the network flow information stored in the network database, and setting the switch flow information into a corresponding one of the plurality of switch devices.

A non-transitory computer readable storage medium according to the present invention is a storage medium recording thereon a program installed on a computer which includes a network database that stores topology information representing a network and network flow information representing a data forwarding rule in the network, wherein the network control program is for causing the computer to execute switch control processes of: generating the topology information by taking a plurality of switch devices included in the network as nodes and storing the generated topology information in the network database; generating switch flow information that defines an action of each of the plurality of switch devices, based on the network flow information stored in the network database; and setting the switch flow information into a corresponding one of the plurality of switch devices.

Advantageous Effects of Invention

According to the present invention, it is made possible to control each of switch devices using topology information that represents a network formed by the switch devices, as well as using network flow information that represents data forwarding rules in the network if there is introduced the network flow information.

DESCRIPTION OF EMBODIMENTS

Exemplary embodiments of the present invention will be described with reference to the drawings.

Exemplary Embodiment 1

Figure 1:
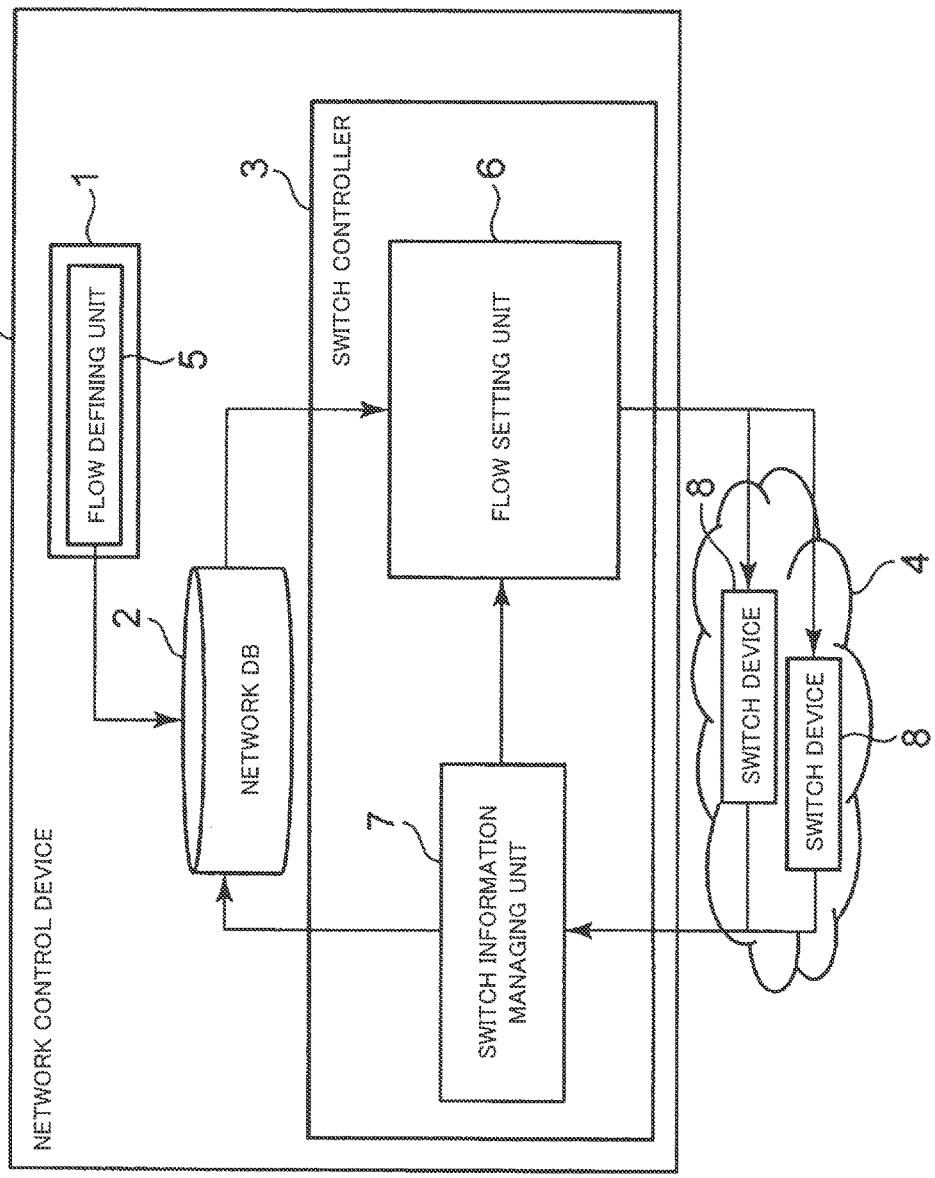
FIG. 1 is a block diagram illustrating an example configuration of a network control device according to a first exemplary embodiment of the present invention.

FIG. 1 is a block diagram illustrating an example configuration of a network control device according to a first exemplary embodiment of the present invention. The network control device 10 according to the first exemplary embodiment includes a switch controller 3 that controls switch devices 8 in a network, a network database (hereinafter abbreviated as DB) 2, and an information registering unit 1.

The network DB 2 is a storage device storing a network model which expresses the network 4 as a model. The network model may include a network flow representation expressing an end-to-end flow.

Operations on the network model can be described so as to correspond to descriptions of operations on the actual network 4.

The information registering unit 1 registers a network flow representation in the network DB 2 in accordance with an application. Specifically, the information registering unit 1 includes a flow defining unit 5. The flow defining unit 5 defines a network flow representation and causes the network DB 2 to store the network flow representation. A network flow representation is described as part of the network model.

The switch controller 3 is connected to switch devices 8 in the network 4. The switch controller 3 includes a switch information managing unit 7 and a flow setting unit 6.

The switch information managing unit 7 collects and accumulates information indicating states of switch devices 8 in the network 4. The switch information managing unit 7 also detects connection relationships among switch devices 8 and stores information on the connection relationships in the network DB 2.

In addition, the switch information managing unit 7 manages correspondence relationships between each of switch devices 8 connected to the switch controller 3 and the network model stored in the network DB 2. Furthermore, the switch information managing unit 7 reflects any change in the state of a switch device 8 and any change in connection relationships among switch devices 8 in the network model stored in the network DB 2.

The flow setting unit 6 converts a network flow representation registered in the network DB storing unit 2 into flow settings for the individual switch devices and sets the flow settings into each of switch devices 8. A flow setting is information defining specific processes to be performed on a packet that matches a certain condition. For example, flow entries in OpenFlow are corresponding to flow settings.

The flow setting unit 6 interprets a network flow representation stored in the network DB 2 and determines which switch devices 8 explicitly appear in the network flow representation. In addition, the flow setting unit 6 determines which switch devices 8 are not explicitly indicated as needed for a forwarding process corresponding to a flow, based on the correspondence relationships between each of switch devices 8 stored in the switch information managing unit 7 and the network model. As a result of the determination, specific switch devices 8 on the forwarding path corresponding to a flow are identified. The above-mentioned switch devices 8 that explicitly appear in the network flow representation are the switch forwarding devices at both ends of a flow path.

The flow setting unit 6 generates flow settings for each of switch devices 8 on the forwarding path in order to implement descriptions of the network flow representation, and then sequentially sets the generated flow settings into the respective switch devices 8.

The flow defining unit 5 defines a network flow representation expressing an end-to-end flow in the network model that is stored in the network DB 2, and causes the network DB 2 to store the network flow representation. In other words, a network flow representation, which is part of information included in a network model, is registered by the flow defining unit 5.

Network models and network flow representations according to the present invention may be similar to the network models and network flow representations described in NPL 5. Network models and network flow representations will be described below.

Figure 2:
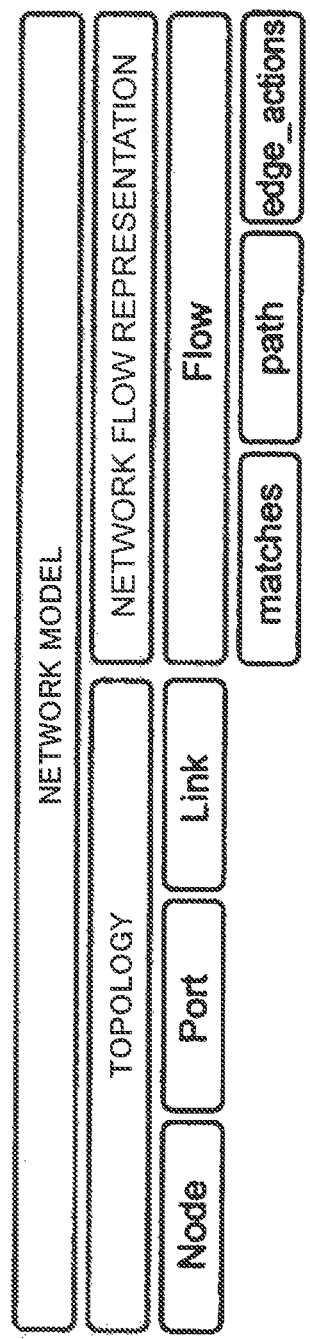
FIG. 2 is a conceptual diagram of a network model.

FIG. 2 is a conceptual diagram of a network model. As illustrated in FIG. 2, a network model includes a topology and a network flow representation.

A topology is represented by Node objects, Port objects, and Link objects. Each of Node objects, Port objects, and Link objects is hereinafter referred to as Node, Port, and Link for short, respectively. A Node corresponds to a switch device. A Port corresponds to a port. A Link corresponds to a connection relationship between switch devices. Nodes, Ports, and Links have their respective identifiers on a network model. The topology in the network model represents the network using these identifiers.

In FIG. 2, one network flow representation is denoted as a "Flow." The network flow representation "Flow" expresses an end-to-end flow configured to span one or more Nodes. One Flow includes matches, path, and edge_actions. Matches is the part defining conditions for a packet to be forwarded. Path is the part defining a forwarding path. Edge_actions is the part defining the output destination of a packet and a set of conditions for rewriting the header.

Matches can define a plurality of conditions. For example, matches can define conditions for an input Node (in_node), conditions for an input Port (in_port), conditions for a packet header, and the like.

Path defines a forwarding path. For example, path defines a forwarding path with a list of Link identifiers, a list of Nodes and Ports which the forwarding path goes through, and the like.

Edge_actions defines a procedure to be conducted when a packet is finally outputted out of the network 4 (see FIG. 1). For example, edge_actions may specify an output Node (out_node) and an output Port (out_port) or define rewriting the packet header such as rewriting a VLAN tag or MAC address.

A network flow representation can be regarded as an expression of rules for forwarding a packet that matches the flow.

Figure 3:
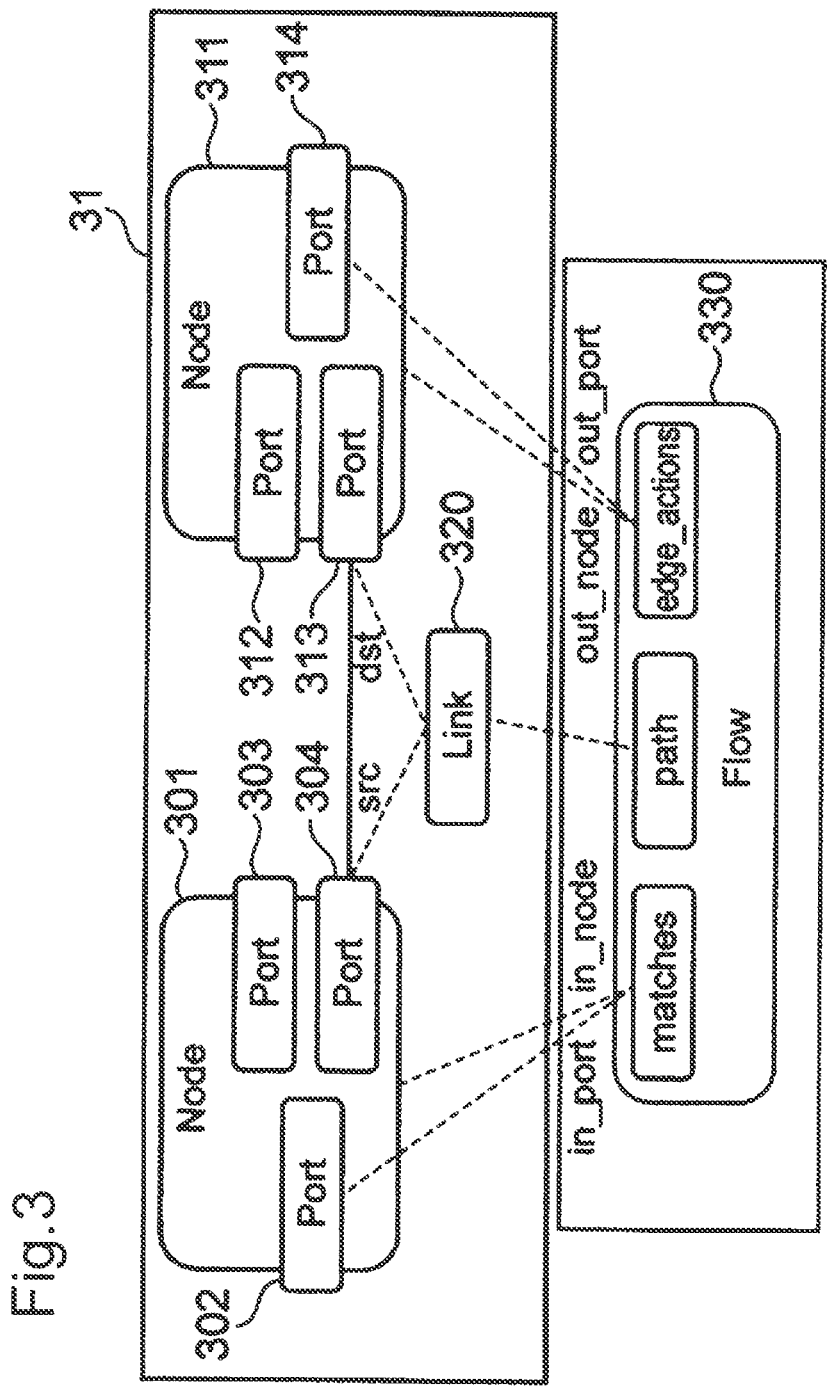
FIG. 3 is a schematic diagram illustrating an example representation of a network model.

FIG. 3 is a schematic diagram illustrating an example expression of a network model. The example network model illustrated in FIG. 3 represents a network 31. In the example illustrated in FIG. 3, the network 31 includes two nodes: Node 301 and Node 311. Node 301 includes three ports: Ports 302 to 304. Node 311 includes three ports: Ports 312 to 314. Link 320 represents that two nodes, Node 301 and Node 311, are connected to each other, with Port 304 on Node 301 serving as a source (src) and Port 313 on Node 311 serving as a destination (dst).

FIG. 3 also exemplifies Flow 330 as a network flow representation. Flow 330 represents that a packet inputted from Port 302 on Node 301 is outputted from Port 314 on Node 311.

Matches in Flow 330 defines conditions for a packet to be forwarded, by designating Node 301 as the input node (in_node) and Port 302 as the input port (in_port).

Path in Flow 330 represents that a packet is forwarded via Link 320.

Edge_actions in Flow 330 defines the output destination of a packet, by designating Node 311 as the output node (out_node) and Port 314 as the output port (out_port).

Figure 4:
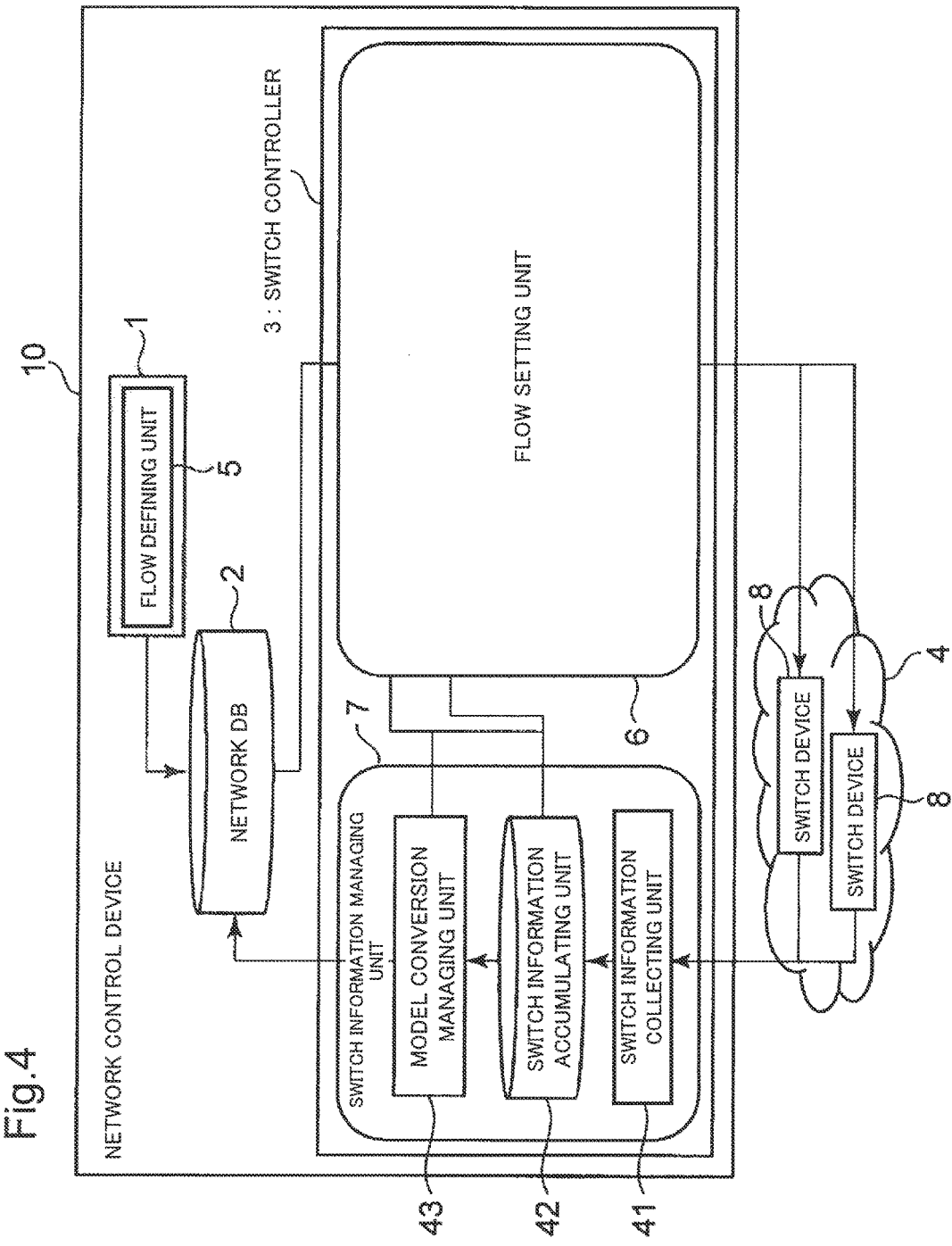
FIG. 4 is a block diagram illustrating an example configuration of switch information managing unit.
Figure 5:
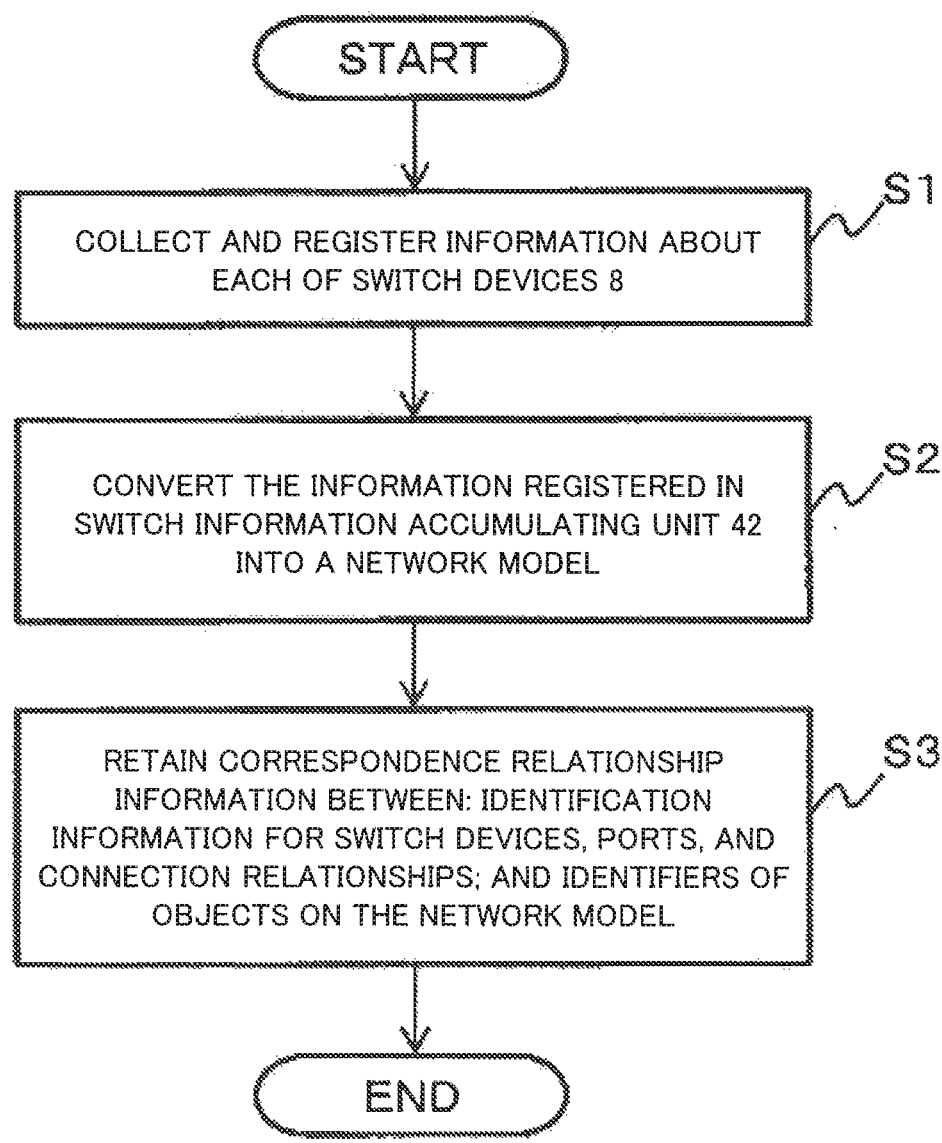
FIG. 5 is a flow chart illustrating an example sequence of processes performed by the switch information managing unit.

The configuration and operations of the switch information managing unit 7 are as follows. FIG. 4 is a block diagram illustrating an example configuration of the switch information managing unit 7. For identical elements as illustrated in FIG. 1, identical reference symbols are used and their descriptions are omitted. FIG. 5 is a flow chart illustrating an example sequence of processes performed by the switch information managing unit 7. The switch information managing unit 7 includes a switch information collecting unit 41, a switch information accumulating unit 42, and a model conversion managing unit 43.

The switch information collecting unit 41 communicates with switch devices 8 to collect, for each of the switch devices 8 and through the use of functions of the switch devices 8, the number of ports on a switch device 8, the operational status of each port, and information on a switch device itself such as link speed, and registers the collected information in the switch information accumulating unit 42 (Step S1). During this step, the switch information collecting unit 41 also collects identification information for switch devices 8 and ports, and registers the information in the switch information accumulating unit 42.

The switch information collecting unit 41 can also detect from switch devices 8 connection relationships (i.e., links) among switch devices 8 by using functions of the switch devices 8 if, for example, the switch devices 8 to be managed are OpenFlow switches. In this case, in Step S1, the switch information collecting unit 41 additionally detects information on links among switch devices 8 from the switch devices 8 and registers the link information in the switch information accumulating unit 42. Specifically, the switch information collecting unit 41 detects, from a switch device 8, specific ports through which the switch device 8 is connected to other switch devices and registers the detected information in the switch information accumulating unit 42.

Note that the switch information collecting unit 41 may collect information on links from a device or the like other than the switch devices 8. For example, the switch information collecting unit 41 may collect information on links among switch devices 8 from a network management system that manages the configuration of the network 4. In this case, the network management system retains information on links among the switch devices 8 belonging to the network 4.

The switch information accumulating unit 42 accumulates every piece of information (information on switch devices 8, ports, links, and the like) collected by the switch information collecting unit 41 and retains the information in such a way that it can be referred by any other unit.

The model conversion managing unit 43 converts the information on switch devices 8, ports, and connection relationships (links) among switch devices 8, as accumulated in the switch information accumulating unit 42, into a network model (more specifically, converts the information into objects in the network model), and registers the model in the network DB 2 (Step S2).

In addition, the model conversion managing unit 43 retains information representing correspondence relationships between the identification information for switch devices 8, ports, and connection relationships (links) in the network 4 and the identifiers of their corresponding objects (Nodes, Ports, and Links) on the network model (Step S3).

Figure 6:
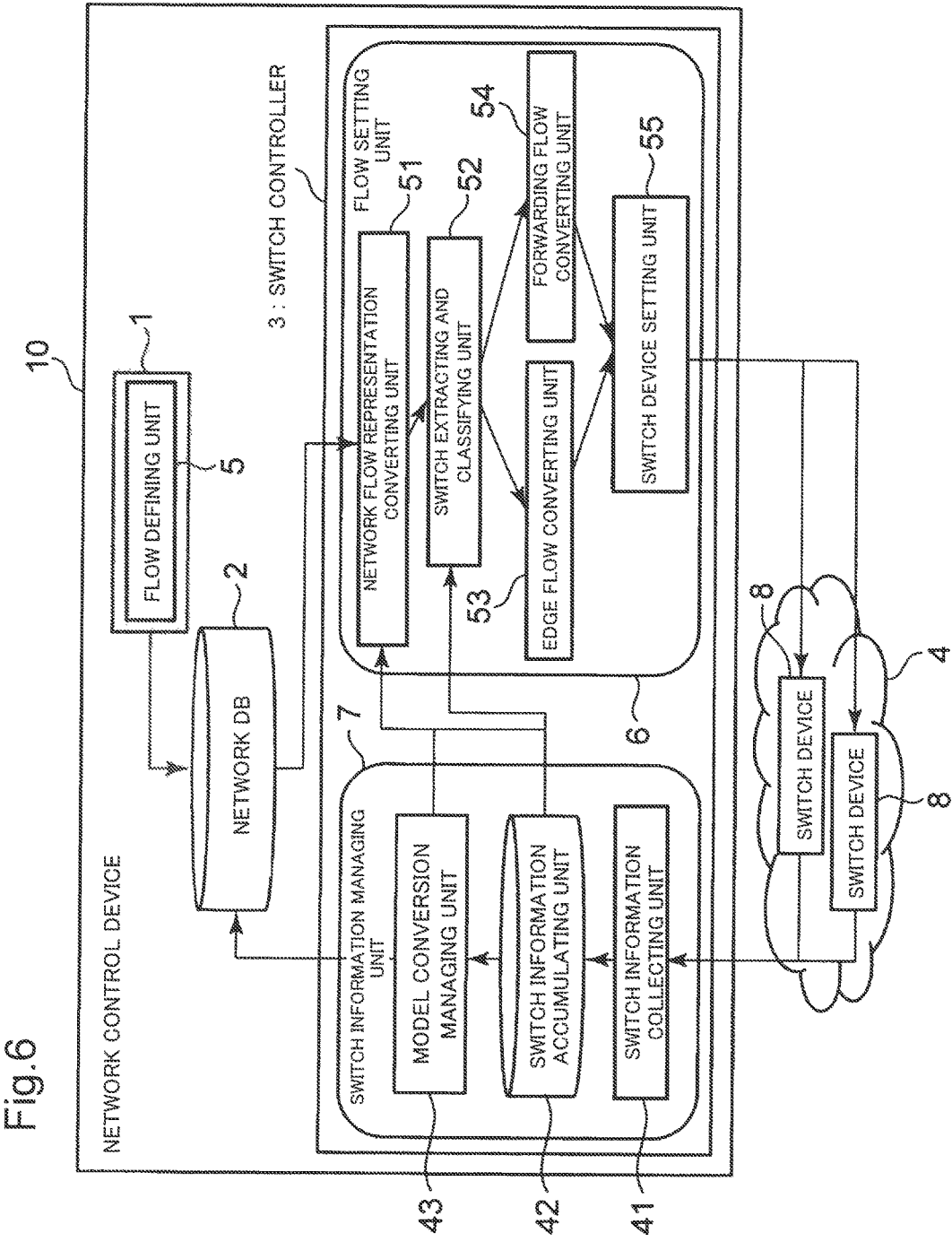
FIG. 6 is a block diagram illustrating an example configuration of flow setting unit.
Figure 7:
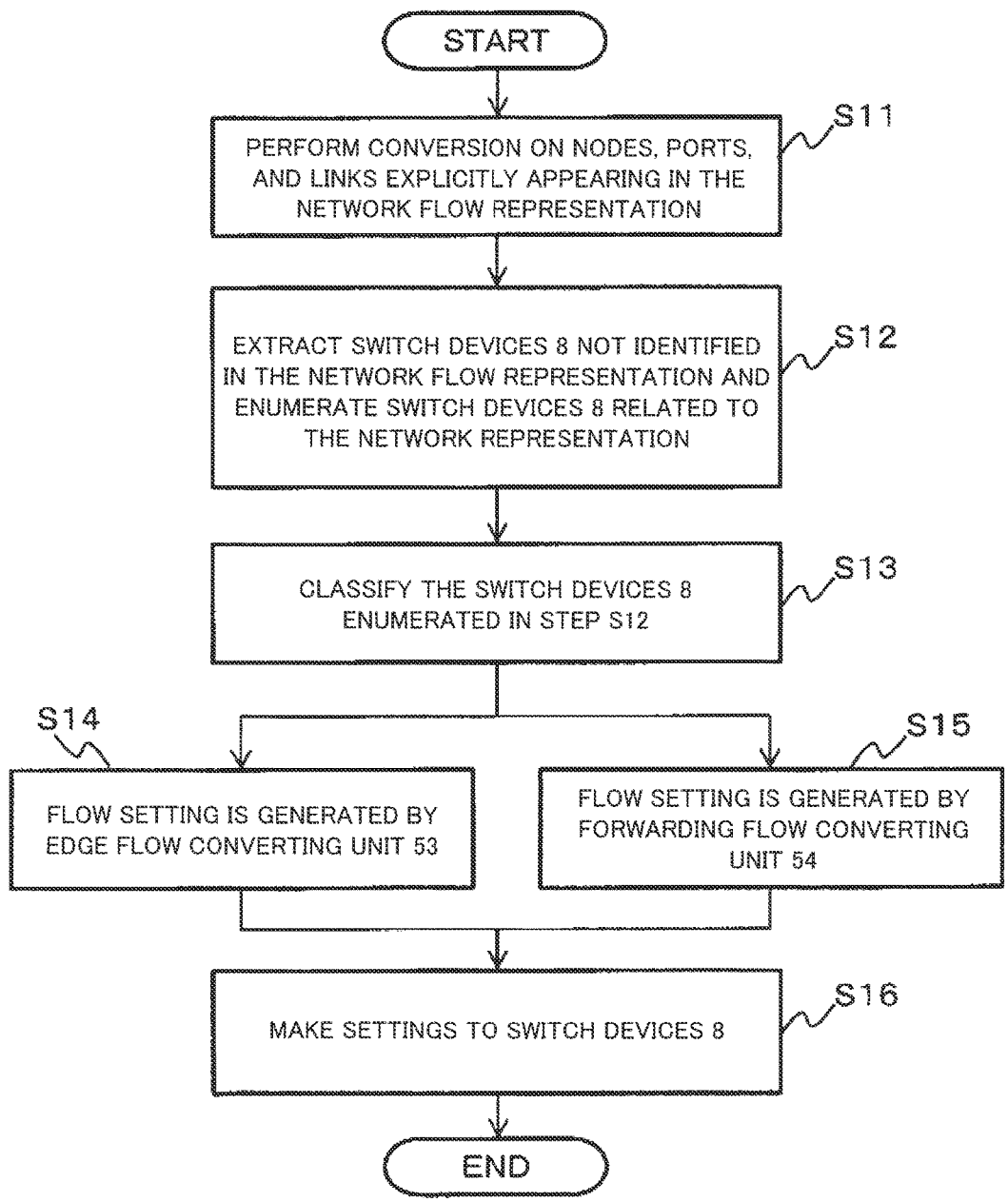
FIG. 7 is a flow chart illustrating an example sequence of processes performed by the flow setting unit.

The configuration and operations of the flow setting unit 6 are as follows. FIG. 6 is a block diagram illustrating an example configuration of the flow setting unit 6. For identical elements as illustrated in FIG. 4, identical reference symbols are used and their descriptions are omitted. FIG. 7 is a flow chart illustrating an example sequence of processes performed by the flow setting unit 6. The flow setting unit 6 includes a network flow representation converting unit 51, a switch extracting and classifying unit 52, an edge flow converting unit 53, a forwarding flow converting unit 54, and a switch device setting unit 55.

The network flow representation converting unit 51 converts the nodes, ports, and links that explicitly appear in a network flow representation into identification information for switch devices, ports, and connection relationships among switch devices in the network 4 (Step S11). Specifically, the network flow representation converting unit 51 requires identification information for switch devices, ports, and connection relationships among switch devices in the network 4 (in other words, the identification information for switch devices, ports, and connection relationships registered in the switch information accumulating unit 42) corresponding to the nodes, ports, and links explicitly appearing in the network flow representation of the model conversion managing unit 43 to obtain identification information for switch devices, ports, and connection relationships among switch devices in the network 4. Then, the network flow representation converting unit 51 converts the nodes, ports, and links explicitly appearing in the network flow representation into such identification information. The conversion result can be regarded as flow information representing a flow in the network 4. The conversion result in Step S11 may hereinafter be referred to as flow information for short.

The nodes explicitly appearing in a network flow representation represent the nodes at both ends of a flow path. Any node not identified in a network flow representation represents a node on the flow path at a position other than both ends of the flow path.

The network flow representation converting unit 51 delivers the flow information obtained in Step S11 to the switch extracting and classifying unit 52.

The switch extracting and classifying unit 52 composes a graph representing a flow path, based on the link information specified by path in the network flow representation (more specifically, the conversion result of path obtained in Step S11). In addition, the switch extracting and classifying unit 52 extracts, from the switch information accumulating unit 42, the information on the switch devices 8 that are on the forwarding path for a packet that matches the flow and are not identified in the network flow representation. Then, the switch extracting and classifying unit 52 enumerates the switch devices 8 related to the network flow representation (switch devices 8 obtained through the above-described extraction, plus switch devices 8 identified in the network flow representation) (Step S12).

The switch extracting and classifying unit 52 classifies each of the enumerated switch devices 8 as the switch device to which the role of inputting or outputting is explicitly specified by matches or edge_actions in the network flow representation or as the switch device to which the role of forwarding is implicitly specified by path (Step S13). The switch extracting and classifying unit 52 delivers identification information for the former switch devices 8, the graph composed of link information, and the flow information obtained in Step S11 to the edge flow converting unit 53, while delivering identification information for the latter switch devices 8, the graph, and the flow information to the forwarding flow converting unit 54. A common graph and common flow information are delivered to the edge flow converting unit 53 and to the forwarding flow converting unit 54.

The edge flow converting unit 53 generates flow settings for the switch devices to which the role of inputting or outputting is explicitly specified by matches or edge_actions in the network flow representation (Step S14). The forwarding flow converting unit 54 generates flow settings for the switch devices to which the role of forwarding is implicitly specified by path (Step S15).

The edge flow converting unit 53 rewrites the conditions explicitly specified by matches or the contents explicitly specified by edge_actions in the network flow representation into a description of forwarding conditions or a description of packet headers that can be recognized by a switch device 8. The conditions explicitly specified by matches and the contents explicitly specified by edge_actions are included in the delivered flow information. Then, the edge flow converting unit 53 converts the results of rewriting into a flow setting which indicates outputting a packet to a port. The edge flow converting unit 53 delivers the flow setting along with the flow information to the switch device setting unit 55.

The forwarding flow converting unit 54 identifies forwarding conditions and a transfer destination of a packet based on the graph and the flow information, and generates, for each switch device 8, a flow setting that matches the forwarding conditions and the transfer destination. The forwarding flow converting unit 54 delivers the generated flow settings along with the flow information to the switch device setting unit 55.

The switch device setting unit 55 sets the flow settings generated by the edge flow converting unit 53 and the flow settings generated by the forwarding flow converting unit 54 into the corresponding switch devices 8 in sequence (Step S16).

In the present exemplary embodiment, the switch information managing unit 7 in the switch controller_3 accumulates information on switch devices 8 and manages correspondence relationships between each of the switch devices 8 and a network model. On the other hand, the flow setting unit 6 uses the information on switch devices 8 accumulated in the switch information managing unit 7 to generate flow settings based on the network flow representation, and sets the flow settings into the respective switch devices 8. In other words, in the present exemplary embodiment, the switch controller 3 makes a conversion of the network flow representation to reflect it in the settings added to switch devices. Accordingly, if a network model and a network flow representation are introduced, the individual switch devices can be controlled by using the network flow representation.

In the first exemplary embodiment, the each unit included in the switch information managing unit 7 and the each unit included in the flow setting unit 6 are implemented by, for example, a CPU in a computer operating in accordance with a network control program. The CPU may, for example, read the network control program from a program storage device included in the computer, and act as the individual unit included in the switch information managing unit 7 and as the individual unit included in the flow setting unit 6 in accordance with the network control program.

Alternatively, the first exemplary embodiment may be configured so that the switch extracting and classifying unit 52 performs processing at a stage before the network flow representation converting unit 51. In this case, the switch extracting and classifying unit 52 refers the topology and the network flow representation that are included in a network model to classify any node on the flow path expressed by the network flow representation, either as a node explicitly appearing in the network flow representation or as a node not explicitly appearing in the network flow representation. Then, the network flow representation converting unit 51 performs a conversion as described above to generate flow information, as well as converting each of the nodes classified by the switch extracting and classifying unit 52 into identification information for their corresponding switch devices in the network 4. Any other aspects are the same as in the above-described first exemplary embodiment.

Exemplary Embodiment 2

According to a second exemplary embodiment of the present invention, Source Flow, which is proposed in NPL 3, is applied to the flow setting unit 6 (see FIG. 1).

In the second exemplary embodiment, a flow setting (information consisting of defined processes to be performed on a packet that matches conditions) according to the first exemplary embodiment is denoted as a "flow entry setting."

Figure 8:
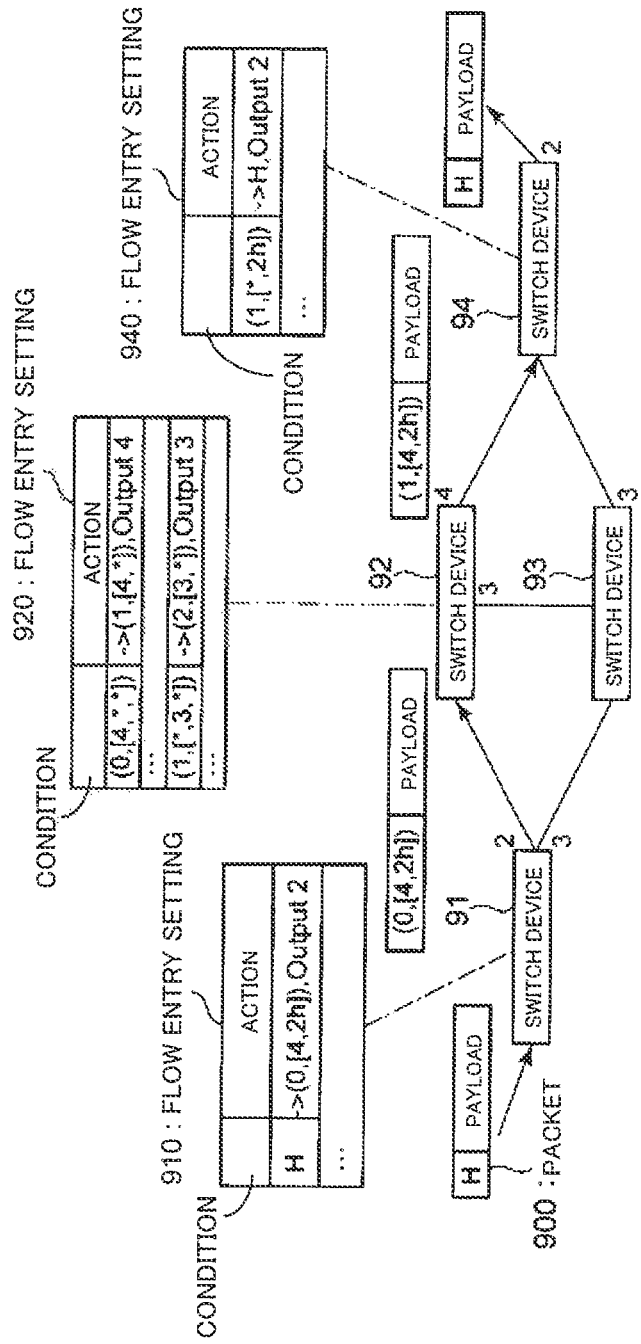
FIG. 8 is a schematic diagram illustrating application of Source Flow to the flow setting unit.

FIG. 8 is a schematic diagram illustrating Source Flow (a technique proposed in NPL 3) applied to the flow setting unit 6. In FIG. 8, numbers appearing near switch devices represent ports.

With reference to the example in FIG. 8, flow entry settings for switch devices 91, 92, and 94 are defined so that when a packet 900 with a header H arrives at the switch device 91, the packet 900 is forwarded to the switch devices 91, 92, and 94 in this order, and then outputted from the port 2 on the switch device 94.

The flow entry setting 910 for the switch device 91 defines actions to be performed on an inputted packet (input actions). The flow entry setting 910 specifies "H" as a condition to be matched against the header of a packet. In addition, the flow entry setting 910 specifies actions on a packet having "H" as contents of its header: setting the initial value of the index counter unit to "0", rewriting the header by embedding therein [4,2h], a sequence of identifiers that define specifics of forwarding (in other words, forwarding operations) in each of the subsequent switch devices, and outputting the packet from the port 2 connected to the next switch device 92 on the forwarding path. The identifiers "4" and "2h" in [4,2h] define specifics of forwarding in the switch devices 92 and 94, respectively. The identifier "4" means outputting from the port 4. The identifier "2h" means recovering the original header and outputting from the port 2. When a packet having "H" as contents of its header is inputted, the switch device 91 performs on the packet the actions specified in the flow entry setting 910.

In the example shown in FIG. 8, the switch device 92 serves as a core node that forwards packets, and thus it is given the flow entry setting that contains identifiers defining specifics of forwarding that depend on the index counter unit along with descriptions of the specifics of forwarding (the flow entry setting 920 in the example shown in FIG. 8). For conditions in a flow entry setting for a core node, any identifier is represented by a wild card other than the identifiers defining specifics of forwarding that depend on the index counter unit (see the flow entry setting 920 in FIG. 8). A core node is a switch device included in a backbone network interconnecting edge nodes in a network. From the point of view of a flow, switch devices at both ends of a flow path are edge nodes and other switch nodes on the flow path are core nodes.

In the header of the packet 900, (0,[4,2h]) is embedded by the switch device 91. (0,[4,2h]), which is embedded in the header, matches the condition listed in the first row of the flow entry setting 920 in FIG. 8. Accordingly, upon receipt of the packet 900, the switch device 92 increments the value of the index counter unit, and then outputs the packet from the port 4 as specified by the identifier defining specifics of forwarding.

The switch device 94 is given the flow entry setting 940 for implementing an output action to terminate the flow. For conditions in a flow entry setting for a switch device terminating a flow, any identifier other than the identifiers defining specifics of forwarding that depend on the index counter unit is also represented by a wild card (see the flow entry setting 940 in FIG. 8). Upon receipt of a packet matching the conditions in the flow entry setting 940, the switch device 94 recovers the original contents of the header field, "H", by removing portions embedded in the header field, and outputs the packet from the port 2 as specified in the flow entry setting 940.

Figure 9:
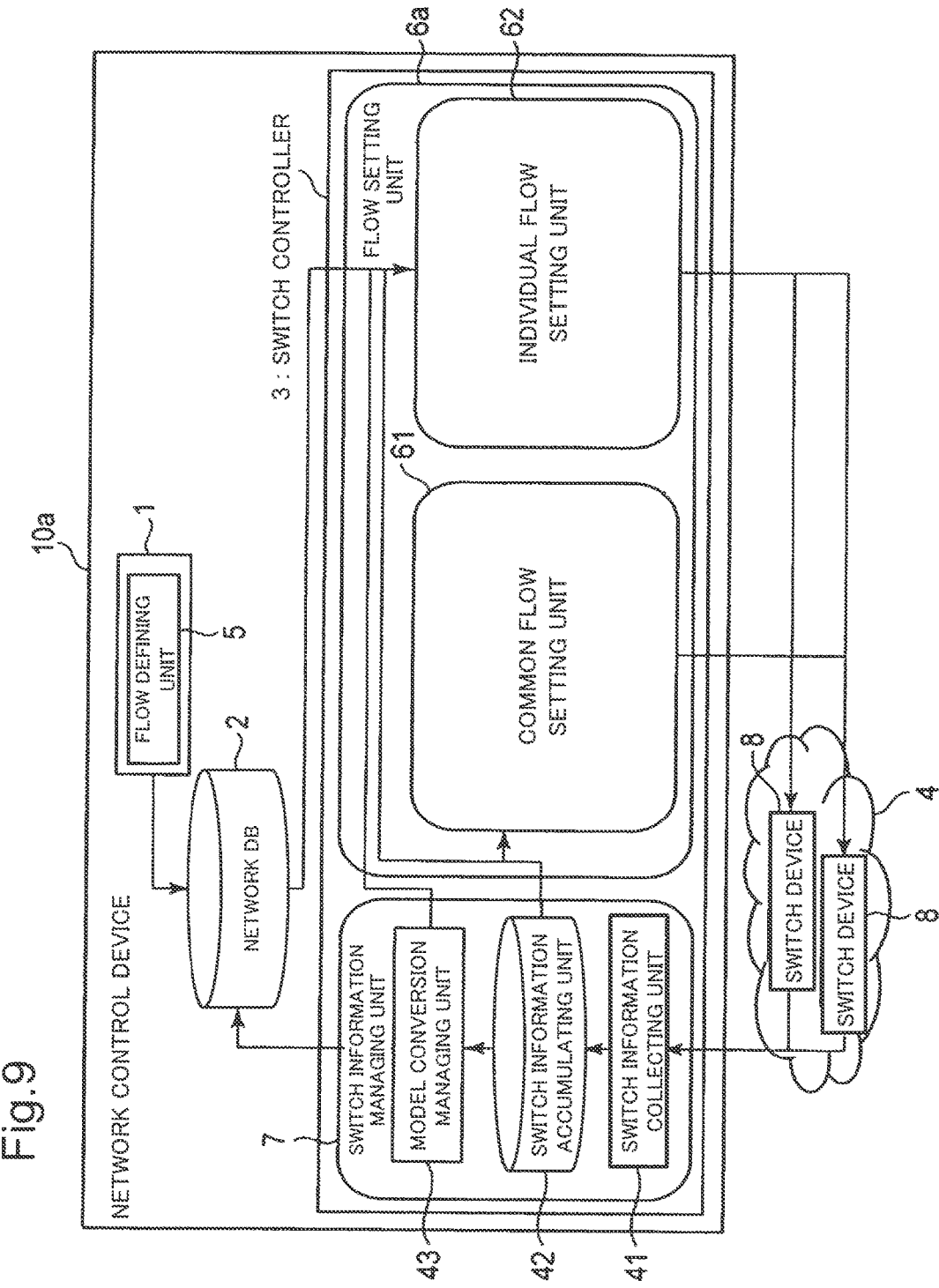
FIG. 9 is a block diagram illustrating an example configuration of a network control device according to a second exemplary embodiment of the present invention.

FIG. 9 is a block diagram illustrating an example configuration of a network control device according to the second exemplary embodiment of the present invention. For identical elements to the elements in the first exemplary embodiment, identical reference symbols are used and descriptions of these elements are omitted.

A network control device 10a according to the second exemplary embodiment includes a switch controller 3a for controlling a switch devices 8 in a network, a network DB 2, and an information registering unit 1. The network DB storing unit 2 and the information registering unit 1 are the same as the network DB 2 and the information registering unit 1 according to the first exemplary embodiment, respectively.

The switch controlling unit 3a includes a switch information managing unit 7 and a flow setting unit 6a. The switch information managing unit 7 includes a switch information collecting unit 41, a switch information accumulating unit 42, and a model conversion managing unit 43. The switch information managing unit 7, the switch information collecting unit 41, the switch information accumulating unit 42, and the model conversion managing unit 43 are the same as the switch information managing unit 7, the switch information collecting unit 41, the switch information accumulating unit 42, and the model conversion managing unit 43 according to the first exemplary embodiment, respectively.

The flow setting unit 6a includes common flow setting unit 61 and individual flow setting unit 62.

The common flow setting unit 61 generates flow entry settings for switch devices 8 corresponding to core nodes and sets the flow entry settings into the switch devices 8.

The individual flow setting unit 62 generates flow entry settings for the switch devices 8 explicitly appearing in a network flow representation and sets the flow entry settings into the switch devices 8.

Figure 10:
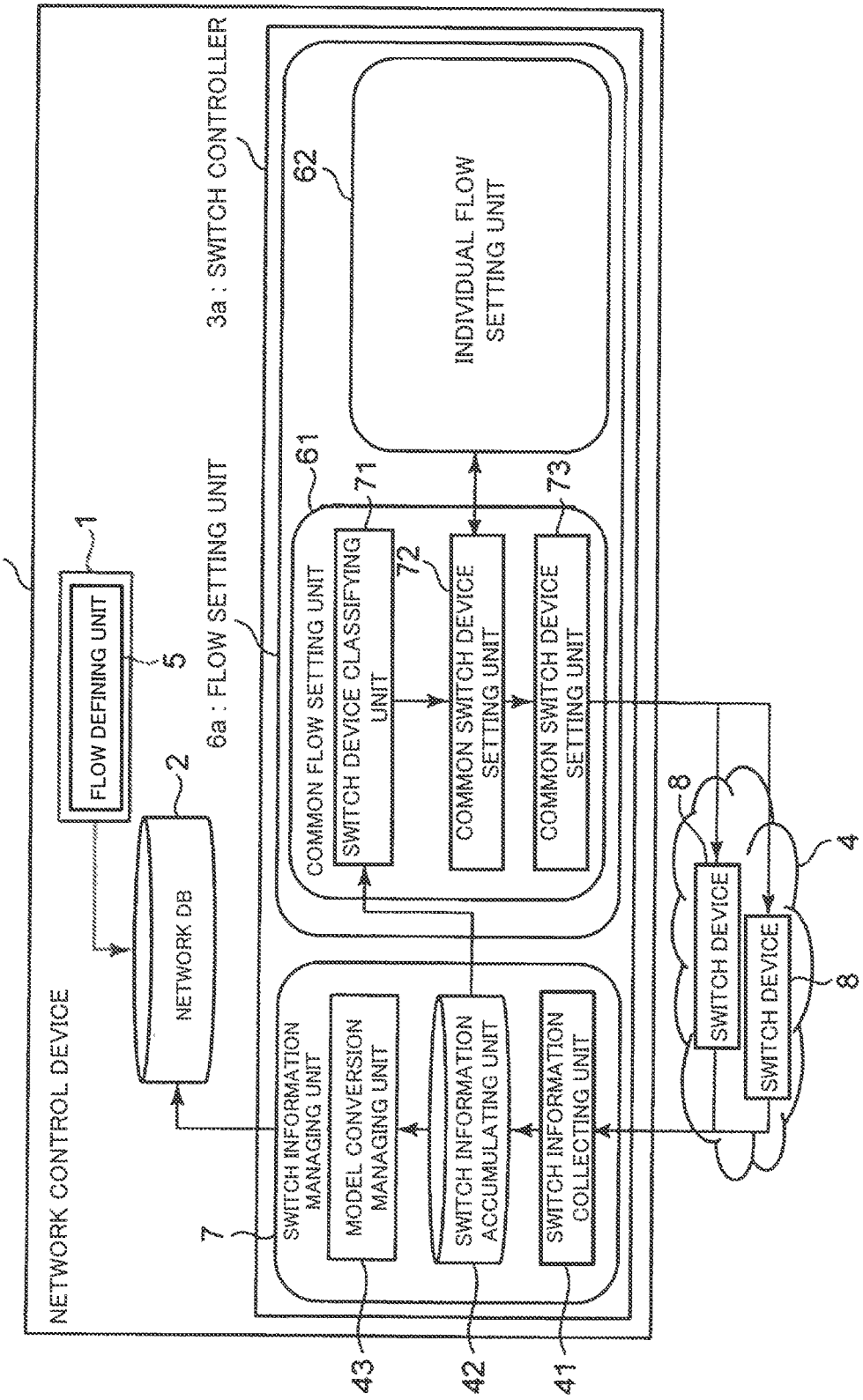
FIG. 10 is a block diagram illustrating an example configuration of common flow setting unit.
Figure 11:
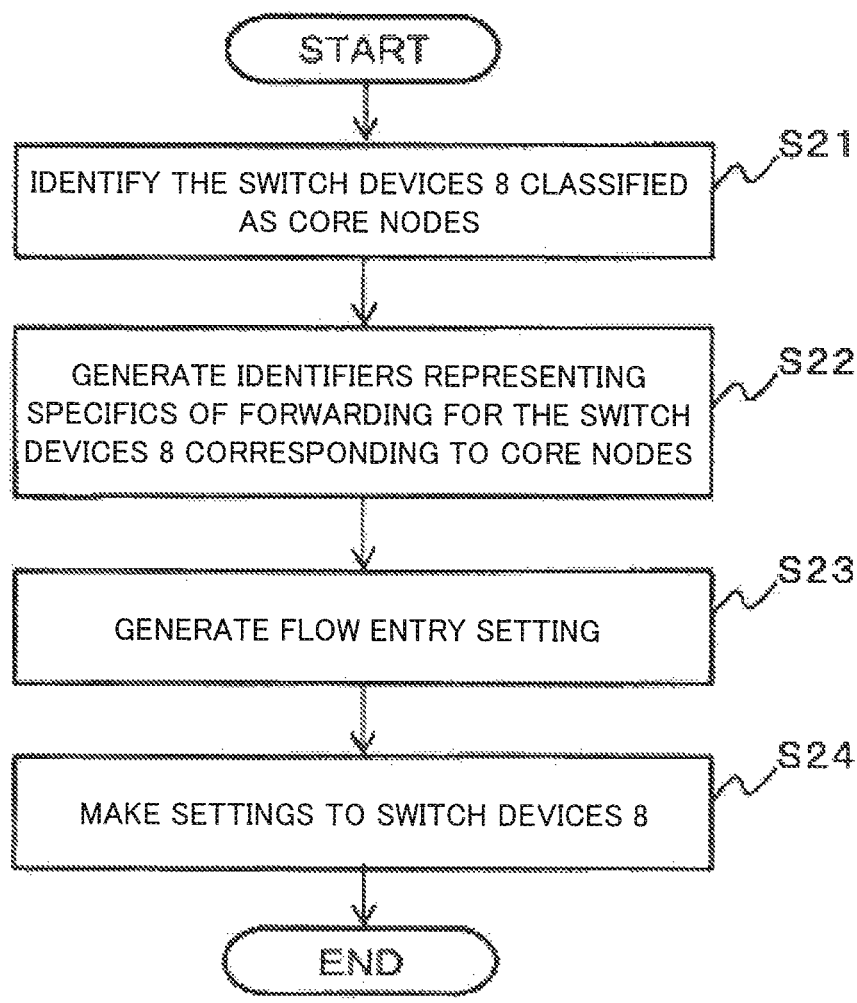
FIG. 11 is a flow chart illustrating an example sequence of processes performed by the common flow setting unit.

The configuration and operations of the common flow setting unit 61 are as follows. FIG. 10 is a block diagram illustrating an example configuration of the common flow setting unit 61. For identical elements as illustrated in FIG. 9, identical reference symbols are used and their descriptions are omitted. FIG. 11 is a flow chart illustrating an example sequence of processes performed by the common flow setting unit 61. The common flow setting unit 61 includes a switch device classifying unit 71, a core flow generating unit 72, and a common switch device setting unit 73.

The switch device classifying unit 71 reads the information that is stored in the switch information accumulating unit-42 and indicating connection relationships among switch devices 8, and identifies, based on the information, the switch devices 8 classified as being corresponding to core nodes (Step S21). The switch device classifying unit 71 then delivers the information on the switch devices 8 corresponding to core nodes to the core flow generating unit 72.

The core flow generating unit 72 generates and retains identifiers that represent specifics of forwarding (in other words, forwarding operations) for each of the switch devices 8 corresponding to core nodes (Step S22). Specifically, for each of the switch devices 8 corresponding to core nodes, the core flow generating unit 72 generates and retains an identifier representing the action of outputting a packet from a port on a per-port basis. With reference to the switch device 92 illustrated in FIG. 8 as an example, the core flow generation unit 72 generates "4", an identifier representing the action of outputting a packet from the port 4, while generating "3", an identifier representing the action of outputting a packet from the port 3.

Next, the core flow generating unit 72 generates a flow entry setting for each of the switch devices 8 corresponding to core nodes (Step S23). Specifically, the core flow generating unit 72 generates a flow entry setting which indicates conditions for a packet by describing an identifier in a sequence of identifiers at a position determined depending on the value of the index counter unit, and which specifies the action corresponding to the identifier to be performed on a packet matching the conditions (outputting from a port) as well as specifying incrementing the value of the index counter unit. The core flow generating unit 72 defines a combination of the conditions and actions for each value of the index counter unit. The flow entry setting 920 in FIG. 8 shows, by example, conditions and actions for the index counter unit value 0, as well as conditions and actions for the index counter unit value 1. The core flow generating unit 72 delivers each flow entry setting as generated to the common switch device setting unit 73.

The common switch device setting unit 73 sets the flow entry settings generated in Step S23 into the corresponding switch devices 8 (Step S24). The switch devices 8 into which the flow entry settings are set in Step S24 are corresponding to core nodes.

Figure 12:
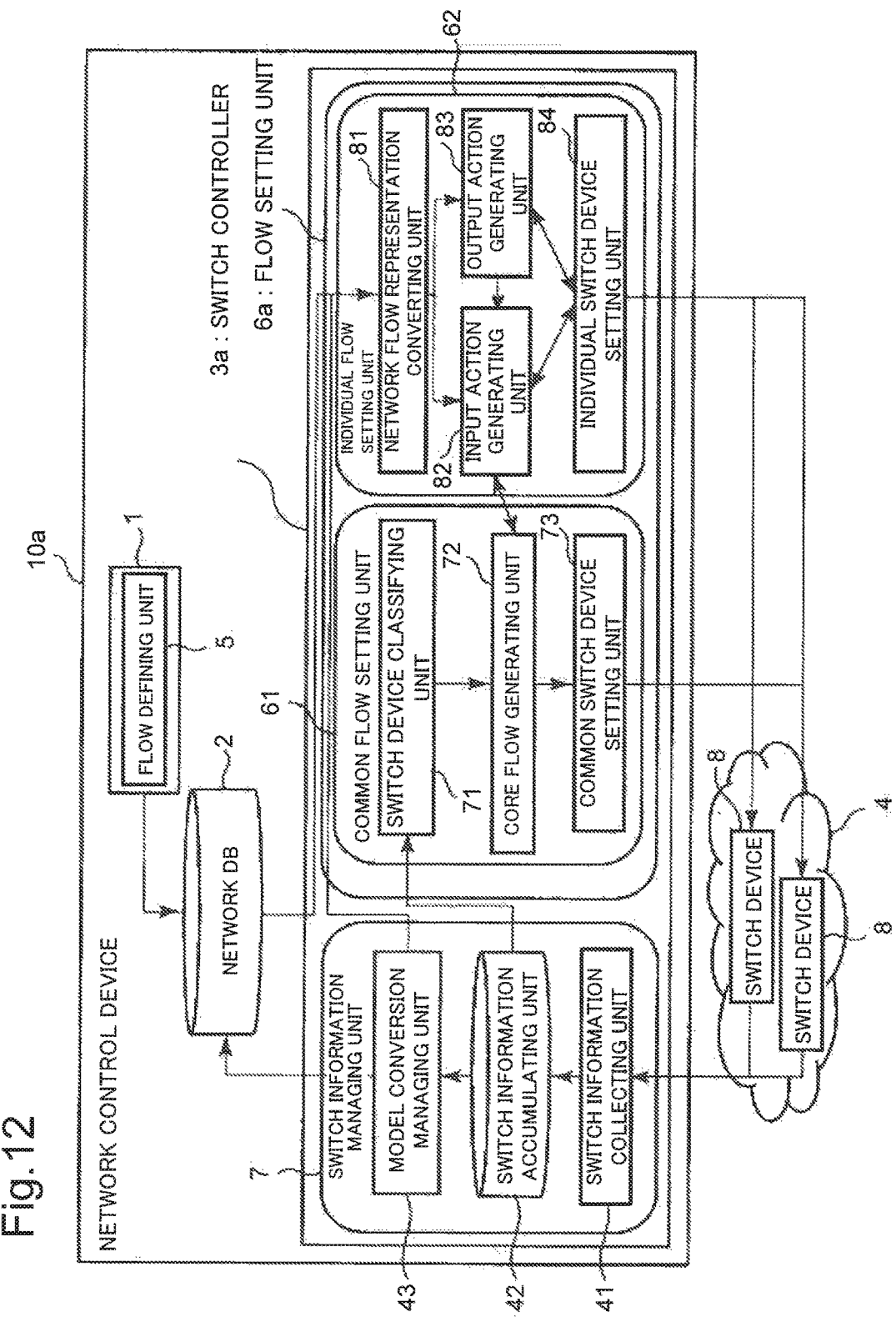
FIG. 12 is a block diagram illustrating an example configuration of individual flow setting unit.
Figure 13:
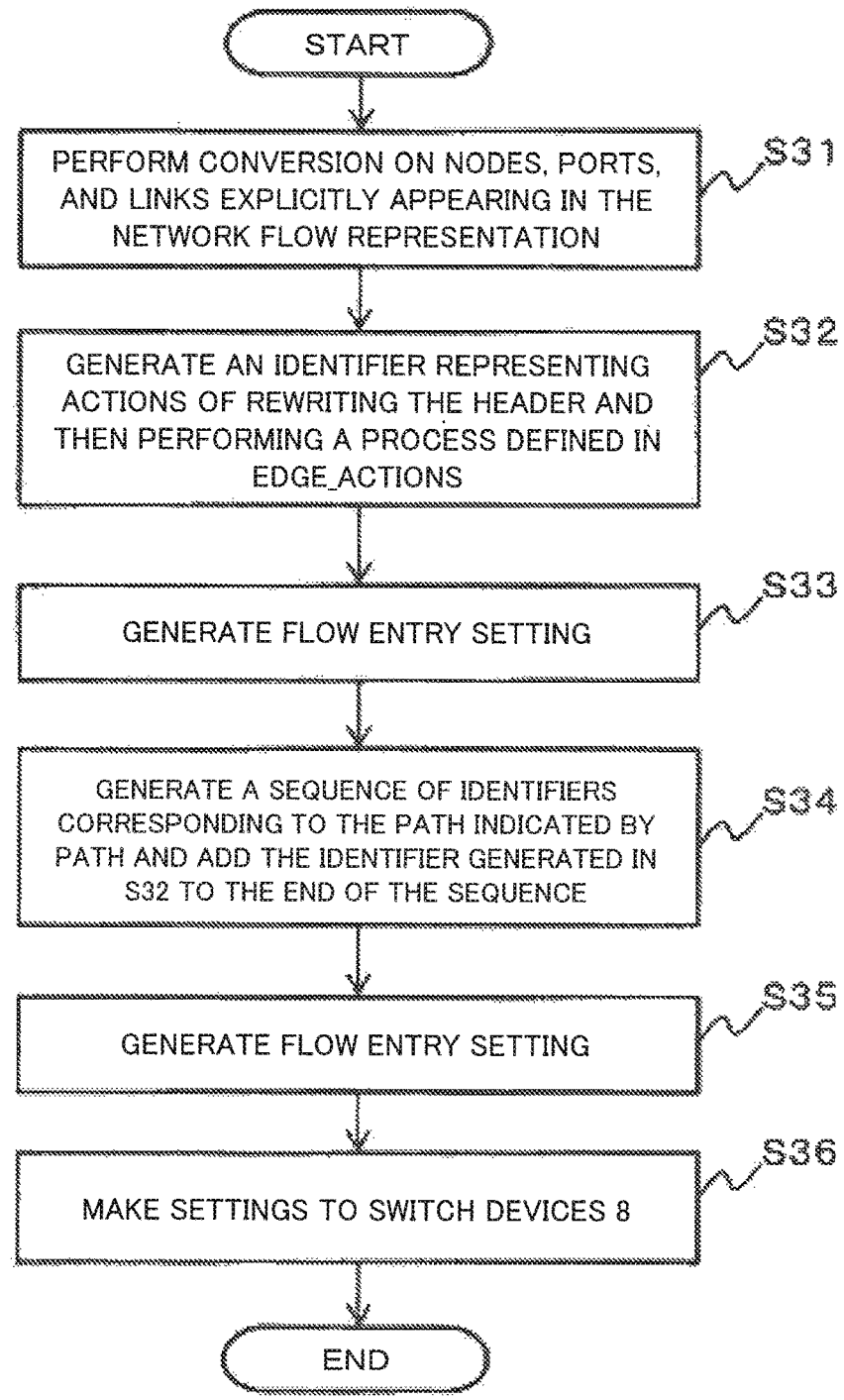
FIG. 13 is a flow chart illustrating an example sequence of processes performed by the individual flow setting unit.

The configuration and operations of the individual flow setting unit 62 are as follows. FIG. 12 is a block diagram illustrating an example configuration of the individual flow setting unit 62. For identical elements as illustrated in FIG. 10, identical reference symbols are used and their descriptions are omitted. FIG. 13 is a flow chart illustrating an example sequence of processes performed by the individual flow setting unit 62. The individual flow setting unit 62 includes a network flow representation converting unit 81, an input action generating unit 82, an output action generating unit 83, and an individual switch device setting unit 84.

The network flow representation converting unit 81 converts the nodes, ports, and links that explicitly appear in the network flow representation into identification information for switch devices, ports, and connection relationships among switch devices in the network 4 (Step S31). Specifically, the network flow representation converting unit 81 requires identification information for switch devices, ports, and connection relationships among switch devices in the network 4 (in other words, inquires about the identification information for switch devices, ports, and connection relationships registered in the switch information accumulating unit 42) corresponding to the nodes, ports, and links explicitly appearing in the network flow representation of the model conversion managing unit 43 to obtain identification information for switch devices, ports, and connection relationships among switch devices in the network 4. The network flow representation converting unit 81 converts the nodes, ports, and links explicitly appearing in the network flow representation into their identification information.

The network flow representation converting unit 81 delivers the information on the switch device 8 appearing in matches to the input action generating unit 82 along with path, which has been converted in Step S31.

On the other hand, the network flow representation converting unit 81 delivers the information on the switch device 8 appearing in edge_actions to the output action generating unit 83.

The output action generating unit 83 generates an identifier which represents actions of rewriting the packet header so as to recover the original header existing as of the time when the packet was inputted to the switch device 8 serving as a source of a flow, and then performing a process defined in edge_actions (Step S32). Examples in FIG. 8 show the flow entry setting 940 containing "2h", which is an identifier generated in Step S32. As described above with reference to examples in FIG. 8, the identifier "2h" unit recovering the original header and outputting from the port 2.

Next, the output action generating unit 83 generates a flow entry setting for the switch device 8 appearing in edge_actions (the switch device 8 serving as a destination of the flow path) (Step S33). The output action generating unit 83 identifies the value of the index counter unit corresponding to the destination of the flow path. Then, the output action generating unit 83 generates a flow entry setting which indicates conditions for a packet by describing the identifier, which has been generated in Step S32, in a sequence of identifiers at a position determined depending on the value, and which specifies the actions corresponding to the identifier to be performed on a packet matching the conditions. The actions corresponding to the identifier that has been generated in Step S32 are, specifically, rewriting the packet header so as to recover the original header existing as of the time when the packet was inputted to the switch device 8 serving as a source of the flow, and then performing a process defined in edge_action. Examples in FIG. 8 show the flow entry setting 940 containing the first row, the content of which is a flow entry setting generated in Step S33. In the first row of the flow entry setting 940 (see FIG. 8), "→H" means recovering the original header.

The output action generating unit 83 delivers the generated flow entry setting to the individual switch device setting unit 84.

Next, the input action generating unit 82 generates a sequence of identifiers corresponding to the path represented by path by referring the identifiers of each of the switch devices 8 retained in the core flow generating unit 72, and adds to the end of the sequence the identifier that has been generated in Step S32 (Step S34). The identifier generated in Step S32 represents the actions of rewriting the packet header so as to recover the original header existing as of the time when the packet was inputted to the switch device 8 serving as a source of the flow, and then performing a process defined in edge_action. According to the example illustrated in FIG. 8, "a sequence of identifiers corresponding to the path represented by path" is [4]. Adding the identifier generated in Step S32 to the end of the sequence results in [4,2h].

Next, the input action generating unit 82 generates a flow entry setting corresponding to the switch device 8 appearing in matches (the switch device 8 serving as a source of the flow path) (Step S35). The input action generating unit 82 generates a flow entry setting which indicates the conditions specified in matches and which defines actions of, for example, rewriting a packet header by embedding an index counter unit whose initial value is "0" and a sequence of identifiers generated in Step S34 in the header of a packet that matches the conditions. The input action generating unit 82 also defines, in the actions part of a flow entry setting, a process of outputting a packet that matches the conditions from the port for implementing a flow path. Examples in FIG. 8 show the flow entry setting 910 containing the first row, the content of which is a flow entry setting generated in Step S35. In the first row of the flow entry setting 910 (see FIG. 8), "→(0,[4,2h])" unit embedding "(0,[4,2h])" in the header.

The input action generating unit 82 delivers the generated flow entry setting to the individual switch device setting unit 84.

The individual switch device setting unit 84 sets the flow entry setting generated by the output action generating unit 83 into the switch device 8 appearing in edge_actions. The individual switch device setting unit 84 also sets the flow entry setting generated by the input action generating unit 82 into the switch device 8 appearing in matches (Step S36).

Consequently, as illustrated in FIG. 8, any packet matching the flow conditions undergoes rewriting of its header at the switch device 8 serving as a source of the flow path, and is sequentially forwarded to the core nodes along the flow path, and then, at the switch device 8 serving as a destination, undergoes recovering of its original header and actions defined in edge_action.

Similarly to the first exemplary embodiment, the second exemplary embodiment makes it possible to control each of switch devices by using network flow representations if a network model and network flow representations are introduced.

In the second exemplary embodiment, while the technique proposed in NPL 3 (Source Flow) is applied to the flow setting unit 6a, the network model stored in the network DB 2 is the same as in the first exemplary embodiment. Accordingly, there is no need to modify an application for the information registering unit 1 which registers a network flow representation. In other words, the flow setting unit 6 can be replaced with the flow setting unit 6a where Source Flow is applied, without modifying an application for the information registering unit 1. In addition, applying the technique proposed in NPL 3 provides effects of, for example, reducing the number of flow entries needed for switch devices 8.

In the above-described second exemplary embodiment, the technique proposed in NPL 3 is applied; however, any other flow forwarding technique may be applied. If any other flow forwarding technique is applied, there is still no need for modifying an application for the information registering unit 1.

In the second exemplary embodiment, the individual unit included in the switch information managing unit 7 and the individual unit included in the flow setting unit 6a are implemented by, for example, a CPU in a computer operating in accordance with a network control program. The CPU may, for example, read the network control program from a program storage device included in the computer, and act as each unit included in the switch information managing unit 7 and as each unit included in the flow setting unit 6a in accordance with the network control program.

Figure 14:
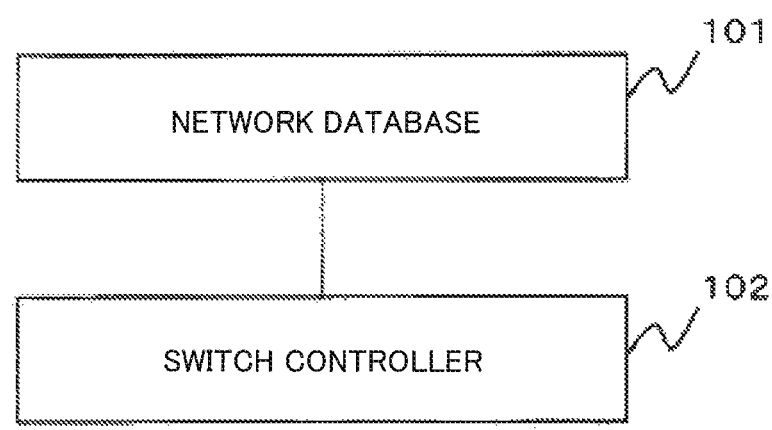
FIG. 14 is a block diagram illustrating major units of the present invention.

Major circuitry of the present invention is as follows. FIG. 14 is a block diagram illustrating major circuitry of the present invention. A network control device according to the present invention includes a network database 101 and a switch controller 102.

The network database 101 (for example, network DB 2) stores topology information representing a network, and network flow information (for example, a network flow representation) representing data forwarding rules for the network.

The switch controller-102 (for example, switch controller-3 and 3a) generates topology information by taking a plurality of switch devices included in the network as nodes and stores the generated topology information in the network database 101, generates switch flow information (for example, flow settings) that defines actions of each of the plurality of switch devices, based on the network flow information stored in the network database 101, and sets the switch flow information into a corresponding one of the plurality of switch devices.

The whole or part of the above exemplary embodiments can be described as, but is not limited to, the following supplementary notes.

(Supplementary Note 1) A network control device including: a network database (for example, the network DB 2) that stores topology information representing a network, and network flow information (for example, a network flow representation) representing a data forwarding rule in the network; and a switch controller (for example, the switch controller 3 and 3a) that generates the topology information by taking a plurality of switch devices included in the network as nodes and stores the generated topology information in the network database, generates switch flow information (for example, a flow setting) that defines an action of each of the plurality of switch devices, based on the network flow information stored in the network database, and sets the switch flow information into a corresponding one of the plurality of switch devices.

(Supplementary Note 2) The network control device according to Supplementary Note 1, wherein the switch controller includes: a switch information managing unit (for example, the switch information managing unit 7) that detects each of the plurality of switch devices included in the network and a link connecting between a detected switch device and another switch device of the plurality of switch devices, generates the topology information, and stores the topology information in the network database; and a flow setting unit (for example, the flow setting unit 6 and 6*a*) that generates the switch flow information based on the network flow information and on the plurality of switch devices and a plurality of links detected by the switch information managing unit, and sets the switch flow information into the corresponding one of the plurality of switch devices.

(Supplementary Note 3) The network control device according to Supplementary Note 2, wherein the switch information managing unit includes: a switch information collecting unit (for example, the switch information collecting unit 41) that detects the plurality of switch devices included in the network and the plurality of links among the plurality of switch devices; a switch information accumulating unit (for example, the switch information accumulating unit 42) that stores information on the pluralities of switch devices and links detected by the switch information collecting unit; and a correspondence relationship managing unit (for example, the model conversion managing unit 43) that generates the topology information based on the information on the pluralities of switch devices and links accumulated in the switch information accumulating unit, and retains correspondence relationship information that indicates correspondence relationships between the pluralities of switch devices and links detected by the switch information collecting unit and a pluralities of nodes and links represented in the topology information.

(Supplementary Note 4) The network control device according to Supplementary Note 3, wherein the flow setting unit includes: a network flow information converting unit (for example, the network flow representation converting unit 51) that converts the pluralities of nodes and links represented in the network flow information into information indicating the pluralities of switch devices and links detected by the switch information collecting unit by referring the correspondence relationship information; a classifying unit (for example, the switch extracting and classifying unit 52) that classifies the plurality of switch devices detected by the switch information collecting unit into at least one first switch device that explicitly appears in the network flow information and at least one second switch device that is on a path indicated by the network flow information and do not explicitly appear in the network flow information; a first switch flow information generating unit (for example, the edge flow converting unit 53) that generates switch flow information that defines an action at an edge of a flow, as the switch flow information for the switch device classified as the first switch device; a second switch flow information generating unit (for example, the forwarding flow converting unit 54) that generates switch flow information that defines an action of forwarding data to a destination switch device, as the switch flow information for the switch device classified as the second switch device; and a switch device setting unit (for example, the switch device setting unit 55) that respectively sets the switch flow information generated by the first switch flow information generating unit and the switch flow information generated by the second switch flow information generating unit into corresponding switch devices.

(Supplementary Note 5) The network control device according to Supplementary Note 3 or 4, wherein the switch information collecting unit communicates with each of the plurality of switch devices included in the network and detects, from a communicating switch device, a link between the communicating switch device and another switch device of the plurality of switch devices.

(Supplementary Note 6) The network control device according to Supplementary Note 3 or 4, wherein the switch information collecting unit collects information on a link of the plurality of links connecting between a switch device and another switch device of the plurality of switch devices from a network management system that manages network configuration.

(Supplementary Note 7) The network control device according to Supplementary Note 2, wherein the switch information managing unit retains correspondence relationship information that indicates correspondence relationships between the pluralities of detected switch devices and links and the pluralities of nodes and links that are represented in the topology information, and wherein the flow setting unit includes: a common flow setting unit (for example, the common flow setting unit 61) that generates switch flow information for a switch device corresponding to a core node by referring information on the pluralities of switch devices and links detected by the switch information managing unit, the switch device being one of the plurality of switch devices included in the network, and sets the switch flow information into the switch devices corresponding to the core node; and an individual flow setting unit (for example, the individual flow setting unit 62) that, based on the network flow information, the correspondence relationship information, and the switch flow information generated by the common flow setting unit, generates switch flow information for a switch device serving as a source of a path indicated by the network flow information, sets the switch flow information into the switch device serving as a source, generates switch flow information for a switch device serving as a destination of the path, and sets the switch flow information into the switch device serving as a destination.

(Supplementary Note 8) The network control device according to Supplementary Note 7, wherein the common flow setting unit includes: a switch device classifying unit (for example, the switch device classifying unit 71) that determines a switch device that is included in the network and is classified as being corresponding to the core nodes by referring information on the pluralities of switch devices and links detected by the switch information managing unit; a core node switch flow information generating unit (for example, the core flow generating unit 72) that generates switch flow information for the switch device corresponding to the core node, the switch flow information defining an action of outputting data from a port on the switch device corresponding to the core node; and a common switch device setting unit (for example, the common switch device setting unit 73) that sets the switch flow information into a corresponding switch device.

(Supplementary Note 9) The network control device according to Supplementary Note 8, including: a network flow information converting unit (for example, the network flow representation converting unit 81) that converts the pluralities of nodes and links represented in the network flow information into information indicating the pluralities of switch devices and links detected by a switch information collecting unit by referring the corresponding relationship information, and identifies the switch device corresponding to the source of a path and the switch device corresponding to the destination of the path; a destination switch flow information generating unit (for example, the output action generating unit 83) that generates switch flow information that defines an action of the switch device corresponding to the destination; a source switch flow information generating unit (for example, the input action generating unit 82) that generates switch flow information that defines an action of the switch device corresponding to the source by referring the switch flow information generated by the core node switch flow information generating unit and the switch flow information generated by the destination switch flow information generating unit; and an individual switch device setting unit (for example, the individual switch device setting unit 84) that sets the switch flow information generated by the destination switch flow information generating unit into the switch device corresponding to the destination, and sets the switch flow information generated by the source switch flow information generating unit into the switch device corresponding to the source.

(Supplementary Note 10) The network control device according to Supplementary Note 3, wherein the flow setting unit includes: a classifying unit that classifies nodes into at least one first node that explicitly appears in the network flow information and at least one second node that is on a path indicated by the network flow information and does not explicitly appear in the network flow information by referring the topology information and the network flow information stored in the network database; a network flow information converting unit that converts each node classified as the first node and each node classified as the second node into information indicating each of the plurality of switch devices detected by the switch information collecting unit; a first switch flow information generating unit that generates switch flow information that defines an action of an edge of a flow, as switch flow information for each of the plurality of switch devices corresponding to the first node; a second switch flow information generating unit that generates switch flow information that defines forwarding data to its destination switch device, as switch flow information for each of the switch devices corresponding to the second node; and a switch device setting unit that respectively sets the switch flow information generated by the first switch flow information generating unit and the switch flow information generated by the second switch flow information generating unit into corresponding switch devices.

The present invention has been described with reference to exemplary embodiments, but the invention is not limited to these embodiments. Various modifications of the present invention that could be understood by those skilled in the art may be made to configurations or details of the invention within the scope of the invention.

The present application claims priority based on Japanese Patent Application No. 2013-240177 filed on Nov. 20, 2013, the entire disclosure of which is incorporated herein.

INDUSTRIAL APPLICABILITY

The present inventions is suitably applied to a network control device that controls networks.

REFERENCE SIGNS LIST

10, 10*a* Network control device
1 Information registering unit
2 Network DB
3 Switch controller
6, 6*a* Flow setting unit
7 Switch information managing unit
41 Switch information collecting unit
42 Switch information accumulating unit
43 Model conversion managing unit
51 Network flow representation converting unit
52 Switch extracting and classifying unit
53 Edge flow converting unit
54 Forwarding flow converting unit
55 Switch device setting unit
61 Common flow setting unit
62 Individual flow setting unit
71 Switch device classifying unit
72 Core flow generating unit
73 Common switch device setting unit
81 Network flow representation converting unit
82 Input action generating unit
83 Output action generating unit
84 Individual switch device setting unit

What is claimed is:

1. A network control device comprising:
a network database that stores topology information representing a network, and network flow information representing a data forwarding rule in the network; and
a switch controller that generates the topology information by taking a plurality of switch devices included in the network as nodes and stores the generated topology information in the network database, generates switch flow information that defines an action of each of the plurality of switch devices, based on the network flow information stored in the network database, and sets the switch flow information into a corresponding one of the plurality of switch devices,
wherein the switch controller comprises:
a switch information managing unit that detects each of the plurality of switch devices included in the network and a link connecting between a detected switch device and another switch device of the plurality of switch devices, generates the topology information, and stores the topology information in the network database; and
a flow setting unit that generates the switch flow information based on the network flow information and on the plurality of switch devices and a plurality of links detected by the switch information managing unit, and sets the switch flow information into the corresponding one of the plurality of switch devices,
and wherein the switch information managing unit comprises:
a switch information collecting unit that detects the plurality of switch devices included in the network and the plurality of links among the plurality of switch devices;
a switch information accumulating unit that stores information on the pluralities of switch devices and links detected by the switch information collecting unit; and
a correspondence relationship managing unit that generates the topology information based on the information on the pluralities of switch devices and links accumulated in the switch information accumulating unit, and retains correspondence relationship information that indicates correspondence relationships between the pluralities of switch devices and links detected by the switch information collecting unit and a pluralities of nodes and links represented in the topology information.

2. The network control device according to claim 1, wherein the flow setting unit comprises:
- a network flow information converting unit that converts the pluralities of nodes and links represented in the network flow information into information indicating the pluralities of switch devices and links detected by the switch information collecting unit by referring the correspondence relationship information;
- a classifying unit that classifies the plurality of switch devices detected by the switch information collecting unit into at least one first switch device that explicitly appears in the network flow information and at least one second switch device that is on a path indicated by the network flow information and do not explicitly appear in the network flow information;
- a first switch flow information generating unit that generates switch flow information that defines an action at an edge of a flow, as the switch flow information for the switch device classified as the first switch device;
- a second switch flow information generating unit that generates switch flow information that defines an action of forwarding data to a destination switch device, as the switch flow information for the switch device classified as the second switch device; and
- a switch device setting unit that respectively sets the switch flow information generated by the first switch flow information generating unit and the switch flow information generated by the second switch flow information generating unit into corresponding switch devices.

3. The network control device according to claim 1, wherein the switch information collecting unit communicates with each of the plurality of switch devices included in the network and detects, from a communicating switch device, a link between the communicating switch device and another switch device of the plurality of switch devices.

4. A network control device comprising:
- a network database that stores topology information representing a network, and network flow information representing a data forwarding rule in the network; and
- a switch controller that generates the topology information by taking a plurality of switch devices included in the network as nodes and stores the generated topology information in the network database, generates switch flow information that defines an action of each of the plurality of switch devices, based on the network flow information stored in the network database, and sets the switch flow information into a corresponding one of the plurality of switch devices, wherein the switch controller comprises:
- a switch information managing unit that detects each of the plurality of switch devices included in the network and a link connecting between a detected switch device and another switch device of the plurality of switch devices, generates the topology information, and stores the topology information in the network database; and
- a flow setting unit that generates the switch flow information based on the network flow information and on the plurality of switch devices and a plurality of links detected by the switch information managing unit, and sets the switch flow information into the corresponding one of the plurality of switch devices, wherein the switch information managing unit retains correspondence relationship information that indicates correspondence relationships between the pluralities of detected switch devices and links and the pluralities of nodes and links that are represented in the topology information, and wherein the flow setting unit comprises:
- a common flow setting unit that generates switch flow information for a switch device corresponding to a core node by referring information on the pluralities of switch devices and links detected by the switch information managing unit, the switch device being one of the plurality of switch devices included in the network, and sets the switch flow information into the switch devices corresponding to the core node; and
- an individual flow setting unit that, based on the network flow information, the correspondence relationship information, and the switch flow information generated by the common flow setting unit, generates switch flow information for a switch device serving as a source of a path indicated by the network flow information, sets the switch flow information into the switch device serving as a source, generates switch flow information for a switch device serving as a destination of the path, and sets the switch flow information into the switch device serving as a destination.

5. The network control device according to claim 4, wherein the common flow setting unit comprises:
- a switch device classifying unit that determines a switch device that is included in the network and is classified as being corresponding to the core nodes by referring information on the pluralities of switch devices and links detected by the switch information managing unit;
- a core node switch flow information generating unit that generates switch flow information for the switch device corresponding to the core node, the switch flow information defining an action of outputting data from a port on the switch device corresponding to the core node; and
- a common switch device setting unit that sets the switch flow information into a corresponding switch device.

6. The network control device according to claim 5, comprising:
- a network flow information converting unit that converts the pluralities of nodes and links represented in the network flow information into information indicating the pluralities of switch devices and links detected by a switch information collecting unit by referring the corresponding relationship information, and identifies the switch device corresponding to the source of a path and the switch device corresponding to the destination of the path;
- a destination switch flow information generating unit that generates switch flow information that defines an action of the switch device corresponding to the destination;
- a source switch flow information generating unit that generates switch flow information that defines an action of the switch device corresponding to the source by referring the switch flow information generated by the core node switch flow information generating unit and the switch flow information generated by the destination switch flow information generating unit; and
- an individual switch device setting unit that sets the switch flow information generated by the destination switch flow information generating unit into the switch device corresponding to the destination, and sets the switch flow information generated by the source switch flow information generating unit into the switch device corresponding to the source.

7. A network control method to be applied to a network control device that comprises a network database that stores topology information representing a network and network flow information representing a data forwarding rule in the network, the network control method comprising:
  generating the topology information by taking a plurality of switch devices included in the network as nodes and storing the generated topology information in the network database;
  generating switch flow information that defines an action of each of the plurality of switch devices, based on the network flow information stored in the network database, and setting the switch flow information into a corresponding one of the plurality of switch devices;
  detecting each of the plurality of switch devices included in the network and a link connecting between a detected switch device and another switch device of the plurality of switch devices, generating the topology information, and storing the topology information in the network database;
  generating the switch flow information based on the network flow information and on the plurality of switch devices and a plurality of links that have been detected, and setting the switch flow information into the corresponding one of the plurality of switch devices;
  detecting the plurality of switch devices included in the network and the plurality of links among the plurality of switch devices;
  storing information on the pluralities of switch devices and links that have been detected; and
  generating the topology information based on the information on the pluralities of switch devices and links that have been accumulated, and retaining correspondence relationship information that indicates correspondence relationships between the pluralities of switch devices and links that have been detected and a pluralities of nodes and links represented in the topology information.

8. A non-transitory computer readable storage medium recording thereon a network control program installed on a computer which comprises a network database that stores topology information representing a network and network flow information representing a data forwarding rule in the network, wherein the network control program is for causing the computer to execute switch control processes of:
  generating the topology information by taking a plurality of switch devices included in the network as nodes and storing the generated topology information in the network database; generating switch flow information that defines an action of each of the plurality of switch devices, based on the network flow information stored in the network database; and setting the switch flow information into a corresponding one of the plurality of switch devices;
  detecting each of the plurality of switch devices included in the network and a link connecting between a detected switch device and another switch device of the plurality of switch devices, generating the topology information, and storing the topology information in the network database;
  generating the switch flow information based on the network flow information and on the plurality of switch devices and a plurality of links that have been detected, and setting the switch flow information into the corresponding one of the plurality of switch devices;
  detecting the plurality of switch devices included in the network and the plurality of links among the plurality of switch devices;
  generating switch flow information for a switch device corresponding to a core node by referring information on the pluralities of switch devices and links that have been detected, the switch device being one of the plurality of switch devices included in the network, and setting the switch flow information into the switch devices corresponding to the core node; and
  based on the network flow information, the correspondence relationship information, and the switch flow information that has been generated, generating switch flow information for a switch device serving as a source of a path indicated by the network flow information, sets the switch flow information into the switch device serving as a source, generating switch flow information for a switch device serving as a destination of the path, and setting the switch flow information into the switch device serving as a destination.

* * * * *